United States Patent
Shirley et al.

(10) Patent No.: US 6,783,610 B2
(45) Date of Patent: Aug. 31, 2004

(54) RAILWAY WHEEL ALLOY

(75) Inventors: Mark S. Shirley, New Albany, OH (US); Richard A. Pilon, Marengo, IL (US)

(73) Assignee: AMSTED Industries Incorporated, Chicago, IL (US)

(*) Notice: Subject to any disclaimer, the term of this patent is extended or adjusted under 35 U.S.C. 154(b) by 34 days.

(21) Appl. No.: 09/798,081

(22) Filed: Mar. 5, 2001

(65) Prior Publication Data

US 2002/0122740 A1 Sep. 5, 2002

(51) Int. Cl.⁷ .................... C22C 38/22; C22C 38/08; C22C 38/44
(52) U.S. Cl. ................. 148/334; 148/335; 148/336; 420/105; 420/108; 420/119; 295/30
(58) Field of Search .................... 295/30; 148/334, 148/335, 336; 420/105, 108, 119

(56) References Cited

U.S. PATENT DOCUMENTS

| | | | | |
|---|---|---|---|---|
| 4,230,488 A | * | 10/1980 | Heller et al. | 420/84 |
| 4,767,475 A | * | 8/1988 | Fukuda et al. | 148/334 |
| 4,895,605 A | * | 1/1990 | Ackert et al. | 148/541 |
| 4,933,024 A | * | 6/1990 | Fukuda et al. | 148/584 |
| 5,209,792 A | * | 5/1993 | Besch et al. | 148/334 |
| 5,382,307 A | * | 1/1995 | Kageyama et al. | 148/320 |
| 5,759,299 A | * | 6/1998 | Yokoyama et al. | 148/334 |
| 6,086,685 A | * | 7/2000 | Jöller et al. | 148/334 |
| 6,254,696 B1 | * | 7/2001 | Ueda et al. | 148/334 |
| 6,361,625 B2 | * | 3/2002 | Fujikake et al. | 148/334 |
| 6,375,763 B1 | * | 4/2002 | Yokoyama et al. | 420/119 |

FOREIGN PATENT DOCUMENTS

| | | | | |
|---|---|---|---|---|
| EP | 0 685 566 A1 | * | 12/1995 | C22C/38/00 |
| JP | 51-002616 A | * | 1/1976 | C22C/38/24 |
| JP | 62-278247 A | * | 12/1987 | C22C/38/06 |
| JP | 01-162596 A | * | 6/1989 | B23K/35/30 |
| JP | 03-271319 A | * | 12/1991 | C22C/38/12 |
| JP | 03-277716 A | * | 12/1991 | C22C/38/44 |
| JP | 11-350074 A | * | 12/1999 | C22C/38/54 |
| JP | 2000-199041 | * | 7/2000 | C22C/38/24 |

OTHER PUBLICATIONS

English translation of JP 01–162596 A.*
English translation of JP 03–271319 A.*

* cited by examiner

*Primary Examiner*—Roy King
*Assistant Examiner*—Harry D Wilkins, III
(74) *Attorney, Agent, or Firm*—Edward J. Brosius

(57) ABSTRACT

A steel alloy, particularly adapted for the manufacture of railway wheels is provided. Such alloy comprises essentially, in weight percentage, carbon 0.67–0.77, manganese 0.70–0.85, silicon 0.65–0.85, phosphorus less than 0.025, sulfur less than 0.025, chromium 0.18–0.25, molybdenum 0.08–0.12, with the balance essentially iron.

Another lower carbon alloy comprises essentially, in weight percentage, carbon 0.16–0.45, manganese 0.90–1.10, silicon 0.50–0.70, phosphorous less than 0.035, sulfur less than 0.035, nickel 1.0–1.5, chromium 0.40–0.60 and molybdenum 0.40–0.60.

6 Claims, No Drawings

RAILWAY WHEEL ALLOY

BACKGROUND OF THE INVENTION

The present invention provides a railway wheel alloy and, more particularly, a railway wheel alloy particularly adapted for use in the manufacture of cast steel railway wheels.

In the manufacture of cast steel railway wheels, it is desirable to utilize a steel alloy that is able to be hardened to provide adequate wear resistance, while also providing adequate resistance to thermal cracking. The mechanical strength of steel can be improved by the addition of alloying elements such as chromium, manganese, and molybdenum. However, such alloy additions must be carefully chosen to minimize increased costs as well as balancing the possible degradation of the improved properties that desirable amounts of such alloys add.

Thermal-mechanical shelling and spalling are the two predominant causes of tread damage found on railway wheels in service. This tread damage results in the significant levels of pre-mature wheel removal from service. The phenomenon of thermal-mechanical shelling is generally experienced in the heavy-haul coal, ore and grain services, where the environment is conducive to this type of failure. The contributing factors related to these services include high normal forces when the railcars are loaded, and when the wheels are subjected to long and steep grades in mountainous regions. The normal forces from railcar loading are, for the railroads, ideally at the maximum allowable for the wheel designs. Spalling involves the transformation of tread surface material into the brittle martensite phase. Sliding of the wheel on the rail causes this material transformation. The present alloy development is aimed to reduce or eliminate the damage caused by thermal-mechanical abuse or sliding of the wheel on the rail.

Three components of thermal-mechanical shelling together allow the tread damage to occur. The mechanical portion of the process is a rolling contact fatigue. The rolling of the wheel provides the cyclical stresses to drive the progressive failure. The thermal component, introduced by the drag braking, not only contributes thermal stresses in the wheel but also reduces the material's ability to resist mechanical loading through reduced material strength at elevated temperature. The final component of this progressive failure is time-at-temperature. The longer the wheel is at an elevated temperature, the greater the number of the loading cycles, which are needed to initiate and propagate the cracks, will occur.

It should also be understood that the desirable alloy of the present invention can be utilized not only in cast steel railway wheels, but also in other forms of manufacture of railway wheels including forging.

Accordingly, it is an object of the present invention to provide an alloy particularly adapted for the manufacture of railway wheels.

It is also an object of the present invention to provide an alloy particularly adapted for the manufacture of cast steel railway wheels having improved hardness and, accordingly, wear resistance, plus resistance to thermal cracking.

SUMMARY OF THE INVENTION

Two specific alloys were directed at the affects of thermal-mechanical shelling.

The first is a chromium-silicon-molybdenum alloy. This alloy has shown great promise in captive heavy haul service. Molybdenum and chromium increase the high temperature properties of the steel. These improved high temperature properties will increase the minimum temperature at which fatigue cracks will initiate and therefore decreases the time the tread material is above the critical temperature. By reducing these two components of fatigue and time-at-temperature, fewer cracks will initiate and propagate in the tread. All three alloying elements increase the steels yield and tensile strength. This will reduce the subsequent propagation of any cracks that do initiate at elevated temperatures while the wheel is rolling under normal operational conditions. An additional benefit of the molybdenum and chromium alloys is improved wear resistance which will lengthen the normal operational life of the wheel.

The second alloy targeted at thermal-mechanical shelling is a nickel-molybdenum alloy. The molybdenum will provide the same benefit as it did in the first alloy, increasing high temperature properties, strength and wear resistance. The nickel additions increase fracture toughness and the ferritic strength of the steel. These improvements will help prevent the generation and propagation of cracks within the steel.

Pitting is associated with the sliding of the wheel on the rail. The material at the contact patch is heated above transformation temperatures, approximately 1600° F., by the sliding friction and is then rapidly quenched by the bulk of the wheel when the wheel stops or rotates. The martensite that is formed is brittle and cracks under subsequent normal rolling loads. This cracking leads to tread pitting, referred to as spalling.

A series of alloys were developed as an attempt to reduce spalling tread damage. The alloys are low carbon steels with alloy additions added to maintain material properties. This approach to the spalling problem does not reduce or eliminate the formation of martensite, but instead, it improves the properties of the martensite and decreases the disparity in properties between the martensite and the base steel. Low carbon martensite is less hard, less brittle and forms at a higher temperature and should inhibit or reduce the pitting associated with the spalling process. The decrease in carbon content results in a significant reduction in material strength and wear properties. To counteract these reductions nickel, chromium, and molybdenum are added. These alloy additions yield the same benefits as documented above.

DETAILED DESCRIPTION

Railway wheels with an alloy as set forth in Example 1–5 below were cast and subjected to various performance field tests.

EXAMPLE 1

Railway wheels were cast with the following alloy composition, in percentage by weight: carbon 0.67–0.70, manganese 0.70–0.85, silicon 0.65–0.85, phosphorus less than 0.025, sulfur less than 0.025, chromium 0.18–0.25 and molybdenum 0.08–0.12.

EXAMPLE 2

Railway wheels were cast with the following alloy composition, in percentage by weight: carbon 0.67–0.77, manganese 0.60–0.85, silicon 0.36–0.60, phosphorus less than 0.035, sulfur less than 0.035, nickel 0.40–0.60 and molybdenum 0.25–0.40.

EXAMPLE 3

Railway wheels were cast with the following alloy composition, in percentage by weight: carbon 0.16–0.25, manganese 0.90–1.10, silicon 0.50–0.70, phosphorus less than 0.035, sulfur less than 0.035, nickel 1.0–1.5, molybdenum 0.40–0.60, chromium 0.40–0.60.

EXAMPLE 4

Railway wheels were cast with the following alloy composition, in percentage by weight: carbon 0.26–0.35, manganese 0.90–1.10, silicon 0.50–0.70, phosphorus less than 0.035, sulfur less than 0.035, nickel 1.0–1.5, molybdenum 0.40–0.60, chromium 0.40–0.60.

EXAMPLE 5

Railway wheels were cast with the following alloy composition, in percentage by weight: carbon 0.36–0.45, manganese 0.90–1.10, silicon 0.50–0.70, phosphorus less than 0.035, sulfur less than 0.035, nickel 1.0–1.5, molybdenum 0.40–0.60, chromium 0.40–0.60.

The wheels were subjected to strenuous performance tests and satisfactory results were obtained.

In fact, when compared with a control group of wheels comprised of a normal steel alloy of the following percentages by weight: carbon 0.67–0.77, manganese 0.60–0.85, silicon greater than 0.15, phosphorus less than 0.05, sulfur less than 0.05, with only trace levels of chromium and molybdenum, the following performance characteristics were determined: after approximately 275,000 miles in ordinary freight car service, 50 percent of the control group composition wheels had been removed for shelling while only 15 percent the preferred alloys of the present invention were removed from service.

Based on these field test results and supporting laboratory tests, the alloys of the present invention are more resistant to shell tread condition than the normal carbon type steel. In fact, in normal freight car service, mileage performance of the cast steel wheels in accordance with the present invention is seen to approach 400,000 miles.

What is claimed is:

1. A steel railway wheel alloy, comprising, in weight percentage, carbon 0.67–0.77, manganese 0.70–0.85, silicon 0.65–0.85, phosphorus less than 0.05, sulfur less than 0.05, chromium 0.14–0.25, molybdenum 0.08–0.14, with the balance essentially iron.

2. A steel railway wheel alloy comprising, in weight percentage, carbon 0.67–0.77, manganese 0.60–0.85, silicon 0.36–0.60, phosphorus less than 0.035, sulfur less than 0.035, nickel 0.40–0.60, molybdenum 0.25–0.40, with the balance essentially iron.

3. A steel railway wheel alloy, comprising, in weight percentage, carbon 0.16–0.45, manganese 0.90–1.10, silicon 0.50–0.70, phosphorus up to 0.035, sulfur up to 0.035, nickel 1.0–1.5, molybdenum 0.40–0.60, chromium 0.40–0.60, with the balance essentially iron.

4. A steel railway wheel, comprising in weight percentage, carbon 0.67–0.77, manganese 0.70–0.85, silicon 0.65–0.85, phosphorus less than 0.05, sulfur less than 0.05, chromium 0.14–0.25, molybdenum 0.08–0.14, with the balance essentially iron.

5. A steel railway wheel comprising in weight percentage, carbon 0.67–0.77, manganese 0.60–0.85, silicon 0.36–0.60, phosphorus less than 0.035, sulfur less than 0.035, nickel 0.40–0.60, molybdenum 0.25–0.40, with the balance essentially iron.

6. A steel railway wheel, comprising, in weight percentage, carbon 0.16–0.45, manganese 0.90–1.10, silicon 0.50–0.70, phosphorus up to 0.035, sulfur up to 0.035, nickel 1.0–1.5, molybdenum 0.40–0.60, chromium 0.40–0.60, with the balance essentially iron.

* * * * *